US009584288B2

(12) United States Patent
Nobukiyo et al.

(10) Patent No.: US 9,584,288 B2
(45) Date of Patent: Feb. 28, 2017

(54) COMMUNICATION CHANNEL QUALITY ESTIMATING METHOD, WIRELESS COMMUNICATIONS SYSTEM, BASE STATION, AND PROGRAM

(71) Applicant: NEC Corporation, Tokyo (JP)

(72) Inventors: Takahiro Nobukiyo, Tokyo (JP); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/389,128

(22) PCT Filed: Mar. 13, 2013

(86) PCT No.: PCT/JP2013/057034
§ 371 (c)(1),
(2) Date: Sep. 29, 2014

(87) PCT Pub. No.: WO2013/146273
PCT Pub. Date: Oct. 3, 2013

(65) Prior Publication Data
US 2015/0049703 A1    Feb. 19, 2015

(30) Foreign Application Priority Data

Mar. 28, 2012 (JP) ................................ 2012-073287

(51) Int. Cl.
*H04L 5/00* (2006.01)
*H04L 1/00* (2006.01)
*H04L 1/20* (2006.01)

(52) U.S. Cl.
CPC .......... *H04L 5/0057* (2013.01); *H04L 1/0003* (2013.01); *H04L 1/0009* (2013.01); *H04L 1/203* (2013.01); *H04L 5/0073* (2013.01)

(58) Field of Classification Search
None
See application file for complete search history.

(56) References Cited

U.S. PATENT DOCUMENTS 8,743,728 B2 *  6/2014  Okubo ................... H04L 1/0003
                                                                    370/252
2010/0105390 A1 *  4/2010  Ishii ................... H04W 72/1242
                                                                    455/436
(Continued)

FOREIGN PATENT DOCUMENTS

JP    2011-066545        3/2011
JP    2012-104951        5/2012
KR    WO 2012023785 A2 *  2/2012   .......... H04W 52/146

OTHER PUBLICATIONS

International Search Report for PCT/JP2013/057034 dated Jun. 11, 2013.

(Continued)

*Primary Examiner* — Robert C Scheibel
(74) *Attorney, Agent, or Firm* — Young & Thompson

(57) ABSTRACT

The present invention addresses the problem of providing technology which increases the accuracy for estimating quality of a communication channel even in a case in which transmission time limit frames have been set between neighboring cells. The present application relates to quality estimation of a communication channel used by a base station for performing wireless communication with a terminal within a communication area, and is characterized in acquiring quality information for the communication channel between the base station and the terminal, acquiring reception error information related to reception errors for data communication using the communication channel, acquiring transmission time-limit frame information set by a neighboring base station of the base station, updating correction values in accordance with setting information for the transmission time-limit frame information and the reception error information, and estimating the quality of the communication channel using the correction values and the acquired quality information.

20 Claims, 14 Drawing Sheets

(56) References Cited

U.S. PATENT DOCUMENTS

| | | | | |
|---|---|---|---|---|
| 2011/0300807 A1* | 12/2011 | Kwun | ............... | H04W 24/10 |
| | | | | 455/63.1 |
| 2013/0143614 A1* | 6/2013 | Lee | ............... | H04W 52/146 |
| | | | | 455/509 |
| 2013/0194940 A1* | 8/2013 | Li | ............... | H04J 11/0023 |
| | | | | 370/252 |
| 2013/0294271 A1* | 11/2013 | Nagata | ............... | H04W 24/10 |
| | | | | 370/252 |
| 2013/0294371 A1* | 11/2013 | Ishii | ............... | H04L 1/0003 |
| | | | | 370/329 |
| 2014/0200020 A1* | 7/2014 | Lindoff | ............... | H04L 1/0026 |
| | | | | 455/452.1 |
| 2015/0036602 A1* | 2/2015 | Wang | ............... | H04L 1/0026 |
| | | | | 370/329 |

OTHER PUBLICATIONS

3GPP TS 36.213 V9.3.0 (Sep. 2010), 3GPP TSG RAN E-UTRA Physical layer procedures (Release 9), pp. 27.
3GPP TS 36.300 V10.6.0 (Dec. 2011), 3GPP TSG-RAN E-UTRA and E-UTRAN Overall description Stage 2 (Release 10), pp. 116.
3GPP TS 36.311 V10.4.0 (Dec. 2011), 3GPP TSG-RAN E-UTRA RRC Protocol specification (Release 10), pp. 163-164.
NTT DOCOMO, Remaining issues on eICIC for Rel-10, 3GPP TSG RAN WG1 Meeting #63 R1-106184, Nov. 15, 2010, entire text.

* cited by examiner

COMMUNICATION CHANNEL QUALITY ESTIMATING METHOD, WIRELESS COMMUNICATIONS SYSTEM, BASE STATION, AND PROGRAM

TECHNICAL FIELD

The present invention relates to a communication channel quality estimating method, a wireless communications system, a base station, and a program.

BACKGROUND ART

In wireless communications systems, such as LTE (Long Term Evolution) standardized in the 3GPP (3rd Generation Partnership Project), it is assumed that a plurality of wireless base stations are disposed, where each wireless base station communicates with wireless terminals (referred to as terminals hereinbelow) within its communication area. The communication area is referred to as a cell, which may be divided into a plurality of sub-regions by imparting directivity to an antenna. The sub-region is referred to as a sector cell. In the following description, the term cell refers to a sector cell.

In LTE downlink transmission, a terminal measures communication channel quality information such as an SINR (Signal to Interference plus Noise Ratio), converts it into a quantized CQI (Channel Quality Indicator) referring to a lookup table or the like, and reports the result to the base station. The lookup table is generally created by a link-level simulation in which a physical layer is simulated.

When transmitting data to the terminal, the base station uses the reported CQI to calculate an estimated SINR (SINR_Est), and selects an MCS (Modulation and Coding Schemes) Index referring to a lookup table. Again, the lookup table is generally created by a link-level simulation in which a physical layer is simulated. Then, a TBS (Transport Block Size) Index is determined referring to a lookup table (NPL 1) from the MCS Index, whereby data can be transmitted with optimum data size.

SINR_Est is calculated from EQ. (a) below. SINR_CQI represents an SINR corresponding to a CQI, and Offset represents an offset.

$$\text{SINR\_Est} = \text{SINR\_CQI} + \text{Offset} \quad \text{EQ. (a)}$$

Control for regulating Offset above is OLLA (Outer Loop Link Adaptation). In case that a notification of a reception error (NACK) is received from a terminal, Offset is updated to a smaller value, as given by EQ. (b) below; and in case that a notification of a successful reception (ACK) is received, Offset is updated to a greater value, as given by EQ. (c) below, whereby the SINR_Est can be corrected to achieve a target reception error rate. Delta_Down represents an arbitrary fixed value, and T_Bler represents a target reception error rate.

$$\text{On reception of NACK: Offset} = \text{Offset} - \text{Delta\_Down} \quad \text{EQ. (b)}$$

$$\text{On reception of ACK: Offset} = \text{Offset} + T\_\text{Bler}/(1 - T\_\text{Bler}) \cdot \text{Delta\_Down} \quad \text{EQ. (c)}$$

On the other hand, as measures for addressing an increase of traffic in recent years, as shown in FIG. 12, attention is attracted to a heterogeneous network in which cells of various sizes are present together by introducing a base station with low transmission power (small cell base station) in addition to an ordinary macro base station; however, since the same wireless band is used between adjacent cells, inter-cell interference is perceived as a problem. It is an interference management technology that circumvents the problem. For an interference management technology according to 3GPP Release 10, an eICIC (enhanced Inter-Cell Interference Coordination) is standardized and an ABS (Almost Blank Subframe) is configured (NPL 2). Here, the eICIC is also referred to as a time domain ICIC. The ABS is also referred to as a Protected Subframe. A base station having the ABS configured stops transmission of a data channel (PDSCH: Physical Data Shared Channel) in a downlink. Thus, an SINR in a terminal in an adjacent cell is significantly improved, and enhancement of the throughput of that terminal can be expected.

With introduction of the ABS, a base station can define two measurement subframe sets differentiated between the ABS and a non-ABS from Release 10 (NPL 3). A terminal measures communication channel quality information for each measurement subframe set, and reports a CQI of each set. Thus, a base station can calculate the SINR_Est with high precision regardless whether the subframe is an ABS or a Non-ABS. In an example shown in FIG. 13, four subframes (#1, #3, #5, #9) in a macro cell is defined as an ABS, and a pico terminal connected to a pico cell has Measurement Subframes 1 and 2 configured according to the ABS and the Non-ABS, respectively.

CITATION LIST

Non Patent Literature

NPL 1: 3GPP TS 36.213 V9.3.0 (2010-09), 3GPP TSG RAN E-UTRA Physical layer procedures (Release 9), p. 27.

NPL 2: 3GPP TS 36.300 V10.6.0 (2011-12), 3GPP TSG-RAN E-UTRA and E-UTRAN Overall description Stage 2 (Release 10), p. 116.

NPL 3: 3GPP TS 36.311 V10.4.0 (2011-12), 3GPP TSG-RAN E-UTRA RRC Protocol specification (Release 10), pp. 163-4.

SUMMARY OF INVENTION

Technical Problem

Even though the ABS is introduced as described above, however, there is a problem that the transmission rate is not improved much for a terminal not supporting Release 10 because precision of the estimated SINR (SINR_Est) is significantly degraded relative to an actual SINR (SINR_Real).

A terminal not supporting Release 10 cannot have a measurement subframe set configured. Accordingly, it reports a CQI calculated by averaging the measured interference power values for the ABS and the Non-ABS. Then, as shown in FIG. 14, the Non-ABS has a high SINR_CQI as compared with the SINR_Real, while the ABS has a low SINR_CQI as compared with the SINR_Real. Consequently, in an attempt to attain a target reception error rate, the SINR_Est is considerably small as compared with the SINR_Real for the ABS. Therefore, an MCS Index to be selected becomes significantly smaller for the ABS, thus lowering the transmission rate.

Therefore, a problem to be solved by the present invention is to solve the problem described above, and is to provide a technology for improving precision in SINR estimation.

Disclosure of the Invention

The invention in the present application for solving the problem described above is a quality estimating method for a communication channel used by a base station for wireless communicating with a terminal within a communication area, said method characterized in comprising: a step of acquiring quality information for a communication channel between said base station and said terminal; a step of acquiring reception error information relating to a reception error in a data communication using said communication channel; a step of acquiring information on a transmission limit time frame defined by a base station adjacent to said base station; and an estimating step of updating a corrective value according to the definition in said transmission limit time frame information and said reception error information, and estimating quality of said communication channel using said corrective value and said acquired quality information.

The invention in the present application for solving the problem described above is a wireless communications system in which a base station wireless communicates with a terminal within a communication area, said system characterized in comprising: means for acquiring quality information for a communication channel between said base station and said terminal; means for acquiring reception error information relating to a reception error in a data communication using said communication channel; means for acquiring information on a transmission limit time frame defined by a base station adjacent to said base station; and estimating means for updating a corrective value according to the definition in said transmission limit time frame information and said reception error information, and estimating quality of said communication channel using said corrective value and said acquired quality information.

The invention in the present application for solving the problem described above is a base station for wireless communicating with a terminal within its communication area, said base station characterized in comprising: means for acquiring quality information for a communication channel between said base station and said terminal; means for acquiring reception error information relating to a reception error in a data communication using said communication channel; means for acquiring information on a transmission limit time frame defined by a base station adjacent to said base station; and estimating means for updating a corrective value according to the definition in said transmission limit time frame information and said reception error information, and estimating quality of said communication channel using said corrective value and said acquired quality information.

The invention in the present application for solving the problem described above is a program for a base station for wireless communicating with a terminal within its communication area, said program characterized in causing said base station to function as: means for acquiring quality information for a communication channel between said base station and said terminal; means for acquiring reception error information relating to a reception error in a data communication using said communication channel; means for acquiring information on a transmission limit time frame defined by a base station adjacent to said base station; and estimating means for updating a corrective value according to the definition in said transmission limit time frame information and said reception error information, and estimating quality of said communication channel using said corrective value and said acquired quality information.

Advantageous Effects of Invention

According to the present invention, the throughput of a terminal and the system capacity of a base station can be increased. This is because precision of the estimated SINR relative to the actual SINR is enhanced, so that the selected MCS Index is increased and the transmission rate is improved.

DESCRIPTION OF EMBODIMENTS

The invention in the present application relates to quality estimation for a communication channel used by a base station 100 for wireless communicating with a terminal 200 within a communication area, and is characterized in: acquiring quality information for a communication channel between the base station 100 and the terminal 200; acquiring reception error information relating to a reception error in a data communication using the communication channel; acquiring information on a transmission limit time frame defined by a base station adjacent to the base station; updating a corrective value according to the definition in the transmission limit time frame information and the reception error information; and estimating quality of the communication channel using the corrective value and the acquired quality information.

Specifically, the base station 100 in the present invention is characterized in comprising: a limit time frame control section 104 for acquiring, via a network, information on a pattern of an ABS (Almost Blank Subframe) defined by a base station surrounding the base station 100 and retaining the information; and a channel quality estimating section 105 for deciding whether the terminal 200 is a terminal capable of reporting CSI (Channel State Information) according to the ABS pattern, deciding an adjacent cell from RSRP (Reference Signal Received Power) information received from the terminal, and estimating an SINR (Signal Interference plus Noise Ratio) for the terminal 200 based on OLLA (Outer Loop Link Adaptation) from a CQI (Channel Quality Indicator) and reception decision information.

First Embodiment

[Configuration]

Figure 1:
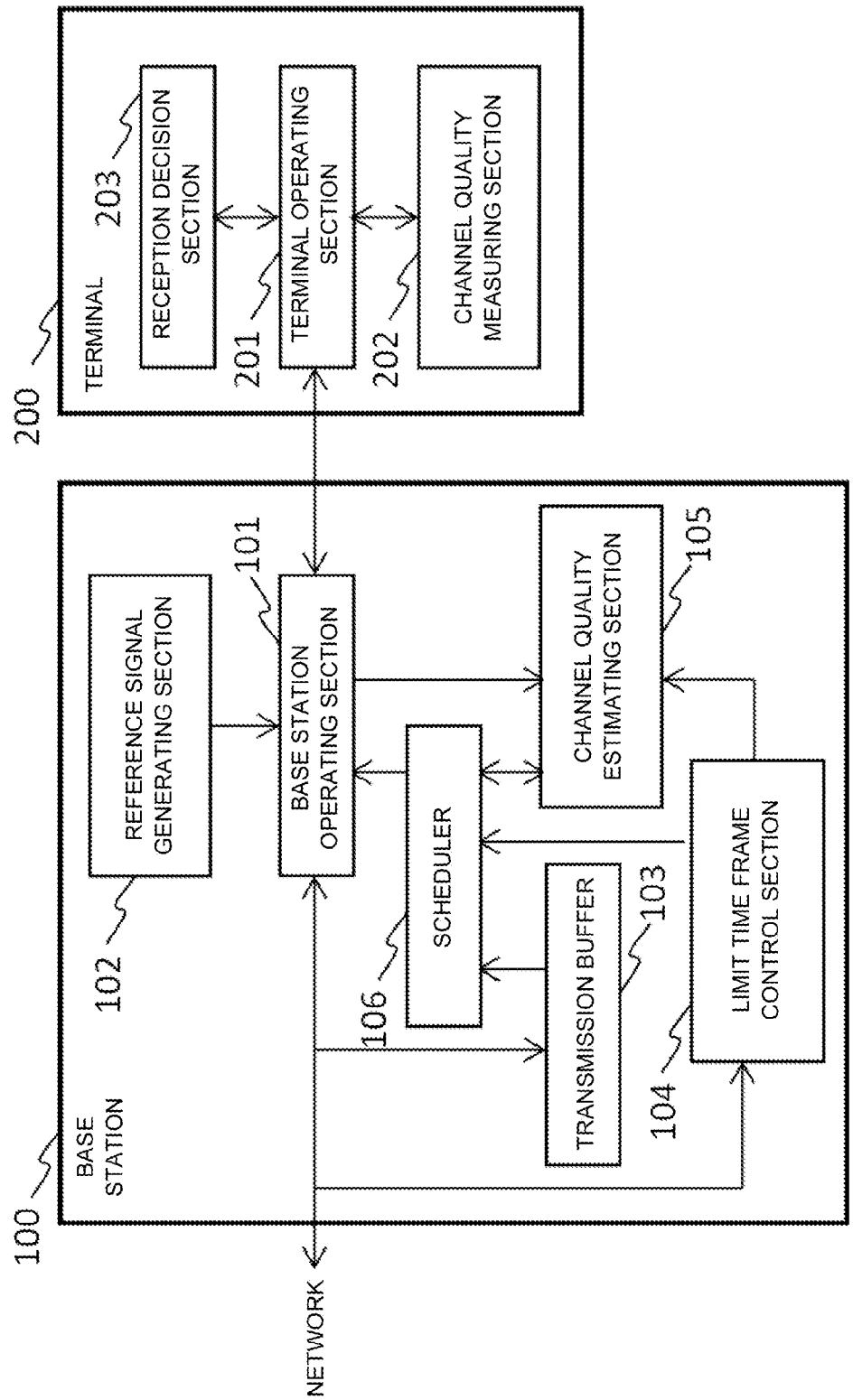
FIG. 1 A block diagram showing a configuration of a wireless communications system in a first embodiment.

FIG. 1 is a block diagram showing a configuration of a wireless communications system in a first embodiment of the present invention. As shown in FIG. 1, the wireless communications system comprises a base station 100 and a terminal 200.

The base station 100 is a wireless communication apparatus for wireless communicating with the terminal 200 lying in a communication area of the base station 100 via a wireless channel. The base station 100 is also connected to a network (not shown) and is capable of making data communications with surrounding base stations. Although not shown, the base station 100 is capable of connecting with a plurality of terminals. Moreover, a plurality of base stations may exist. A wireless band is divided into PRBs (Physical Resource Blocks), the PRB being a unit of allocation. This embodiment will be described for a wireless communications system with reference to an LTE downlink as an example.

The base station 100 comprises main functional sections including a base station operating section 101, a reference signal generating section 102, a transmission buffer 103, a limit time frame control section 104, a channel quality estimating section 105, and a scheduler 106.

The base station operating section 101 has similar functions to those of base stations commonly used in a wireless communications system, including a function of notifying the terminal 200 of information on surrounding cells such as a surrounding base station cell (referred to as a surrounding cell hereinbelow) number, and descriptions thereof will be omitted herein because the configuration and operation thereof are well known in the art.

The reference signal generating section 102 has a function of transmitting a reference signal serving as a reference of communication channel quality information at certain times from the base station operating section 101 to the terminal 200.

The transmission buffer 103 has a function of accumulating data that has arrived from the network and is to be transmitted to the terminal 200, along with management information such as a time of arrival and a destination terminal number.

The limit time frame control section 104 has a function of retaining information on an ABS pattern that has arrived from the network and is defined by a surrounding base station, and notifying the information to the channel quality estimating section 105 and scheduler 106. Further, the limit time frame control section 104 is capable of defining an ABS pattern of its cell. When the pattern is defined, the limit time frame control section 104 notifies the ABS pattern via a wireless channel to a terminal capable of reporting CSI (Channel State Information) according to an ABS pattern. The CSI is a generic name of information on a status of a downlink reference signal, such as a CQI (Channel Quality Indicator). The limit time frame control section 104 is also capable of notifying the ABS pattern to surrounding base stations via the network. The notification of the ABS pattern may be made between base stations directly, or an operation and maintenance (OAM) server may manage the information and notify the ABS pattern.

The channel quality estimating section 105 has a function of deciding whether the terminal 200 is a terminal supporting Release 10 from UE Capability information for the terminal 200 and storing a result, and prescribing a method of reporting a CQI for the terminal 200, a function of deciding a base station cell adjacent to the terminal 200 (referred to as an adjacent cell hereinbelow) from RSRP (Reference Signal Received Power) information received from the terminal 200, a function of retaining CSI reported from the terminal 200, a function of retaining reception decision information (ACK, NACK) reported from the terminal 200, and a function of estimating an SINR for the terminal 200 based on OLLA from a CQI contained in CSI and the reception decision information.

The scheduler 106 has a function of determining a PRB and a TBS Index to be allocated to a terminal based on CSI and the estimated SINR, creating transmission data (Transport Block), and transmitting the data to the mobile station 200 via the base station operating section 101.

Subsequently, the terminal 200 will be described. The terminal 200 comprises main functional sections including a terminal operating section 201, a channel quality measuring section 202, and a reception decision section 203. In this embodiment, a terminal capable of reporting CSI according to an ABS pattern is referred to as "terminal supporting Release 10," and a terminal except that as "terminal not supporting Release 10."

The terminal operating section 201 has similar functions to those of terminals commonly used in a wireless communications system, including a function of transferring UE Capability to the base station 100, and descriptions thereof will be omitted herein because the configuration and operation thereof are well known in the art.

The channel quality measuring section 202 has a function of measuring communication channel quality such as an SINR from a reference signal received from the base station 100, quantizing a result as CSI, and reporting it to the base station 100 via the terminal operating section 201 at a time cued by the base station 100, and a function of measuring RSRP (Reference Signal Received Power) for a reference signal of a currently connecting base station cell and for those of surrounding base station cells (referred to as surrounding cells hereinbelow) notified by the base station 100, and reporting them to the base station 100 at certain times.

The reception decision section 203 has a function of making reception decision for transmission data received from the base station 100, and notifying the reception decision information to the base station 100 via the terminal operating section 201.

[Operation]

Figure 2:
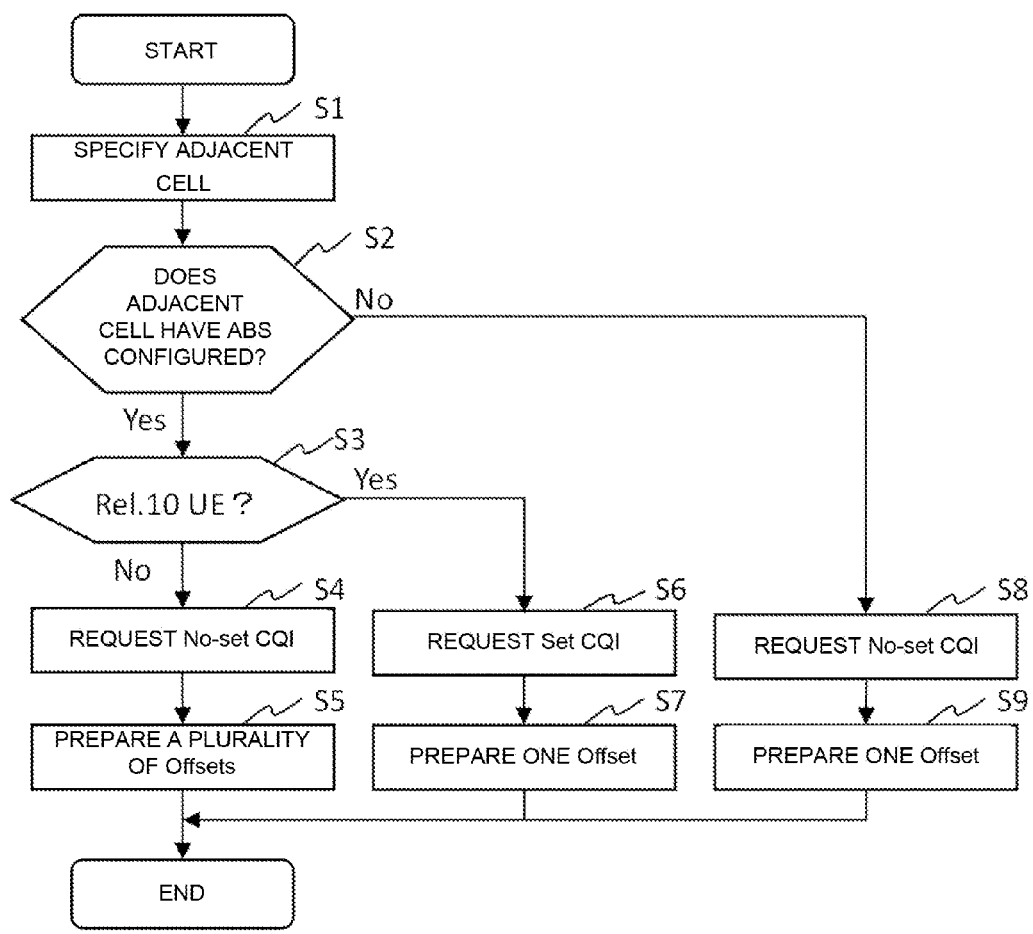
FIG. 2 A flow chart showing processing of decision of an adjacent cell, prescription of a method of reporting a CQI for a terminal, and setting of an initial value of an OLLA offset in the first embodiment.

Next, an operation of the present embodiment will be described with reference to FIGS. 2, 3, and 4. FIG. 2 shows a procedure of operations of the channel quality estimating section 105 for deciding an adjacent cell, prescribing a method of reporting a CQI for a terminal, and setting an OLLA initial value. These operations are conducted as appropriate, such as when a new terminal is connected the base station 100, when RSRP information is received from a terminal, or when notification of an ABS pattern is received from a surrounding cell.

First, the channel quality estimating section 105 determines a cell adjacent to a terminal from RSRP information received from the terminal (S1). In this embodiment, a surrounding cell having the highest RSRP is determined as adjacent cell.

Next, a decision is made as to whether the adjacent cell of the terminal has an ABS configured (S2). An operation in a case wherein the ABS is configured (S2, Yes) will be described first. In case that the ABS is configured, and when the terminal does not support Release 10 (S3, No), a CQI without subframe-based differentiation is requested from the terminal (S4), and a plurality of OLLA offsets are prepared for the current terminal (S5); then, the processing is terminated. In this embodiment, two kinds of offsets (Offset_ABS, Offset_NonABS) are prepared for the ABS and a Non-ABS, and Offset initial values are set according to EQs. (1) and (2) below. In the equations, u represents a terminal number, and (u) represents a parameter of the terminal u. Moreover, Offset_Init_ABS [dB], Offset_Init_NonABS [dB] are default values prepared beforehand.

$$\text{Offset\_ABS}(u)[dB]=\text{Offset\_Init\_ABS} \quad \text{EQ. (1)}$$

$$\text{Offset\_NonABS}(u)[dB]=\text{Offset\_Init\_NonABS} \quad \text{EQ. (2)}$$

On the other hand, for a terminal supporting Release 10 (S3, Yes), a measurement subframe set is defined for the terminal based on the ABS pattern for the adjacent cell, CQI reporting is requested for each set (S6), and one OLLA Offset is prepared for the current terminal (S7); then, the processing is terminated. In this embodiment, one kind of an offset (Offset_Com) common to ABS and Non-ABS is prepared, and the Offset initial value is set according to EQ. (3) below. Offset_Init [dB] is a preset default value.

$$\text{Offset\_Com}(u)[dB]=\text{Offset\_Init} \quad \text{EQ. (3)}$$

Next, an operation in a case wherein the adjacent cell for the terminal does not have an ABS configured (S2, No) will be described. In this case, CQI having no subframe-based differentiation is requested from the terminal (S8), and one OLLA Offset is prepared for the current terminal (S9); then, the processing is terminated. In this embodiment, as in S7, the Offset initial value is set according to EQ. (3).

Figure 3:
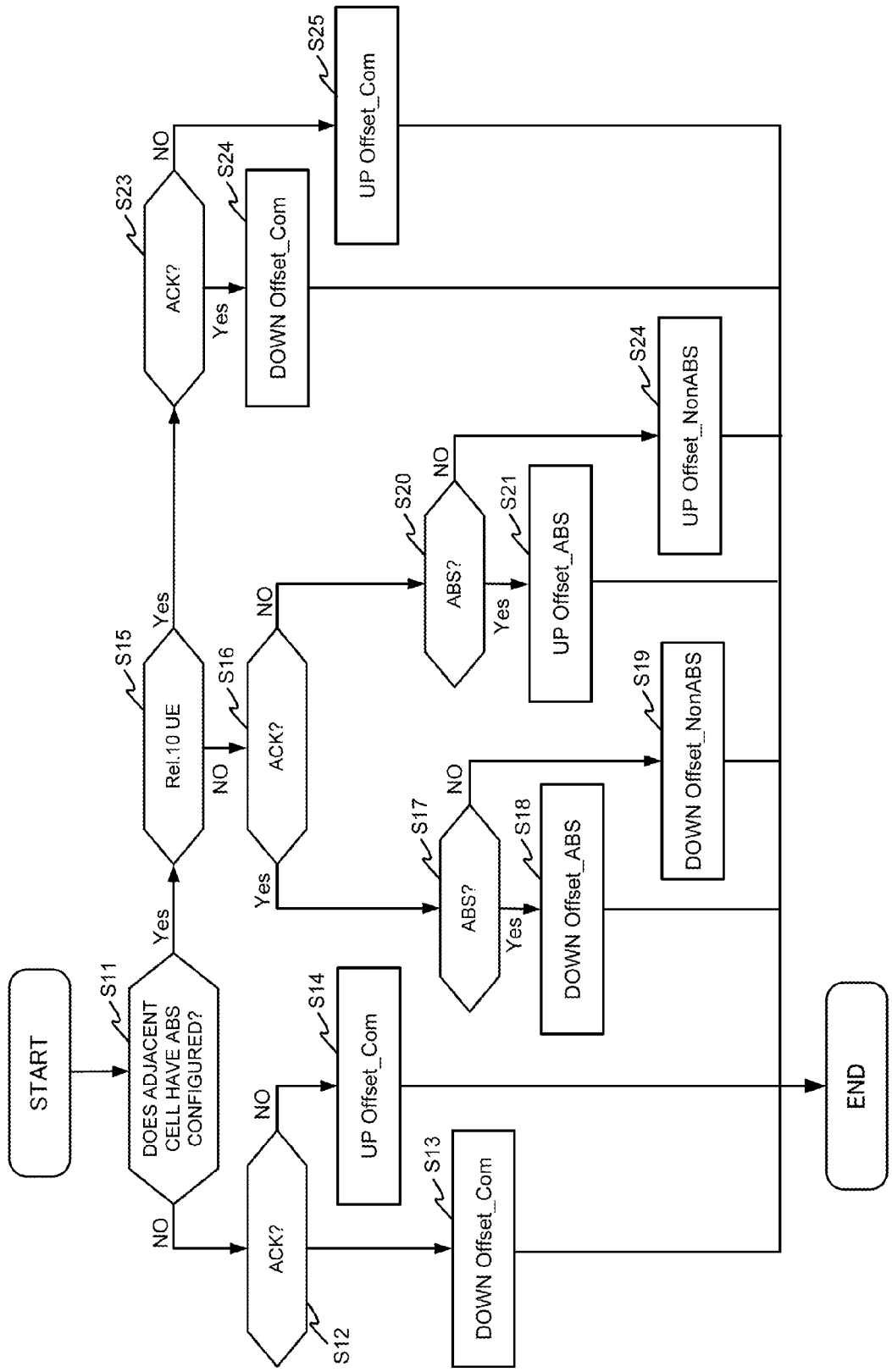
FIG. 3 A flow chart showing processing of updating the OLLA offset in the first embodiment.

FIG. 3 shows a procedure of an operation of the channel quality estimating section 105 for updating the OLLA offset for a terminal. This operation is conducted each time reception decision information (ACK, NACK) is received from the terminal.

First, the channel quality estimating section 105 decides whether an adjacent cell for the terminal that has transmitted reception decision information has an ABS configured (S11). An operation in a case wherein no ABS is configured (S11, No) will be described first. In case that no ABS is configured, and when reception decision is ACK (S12, Yes), Offset_Com is decremented according to EQ. (4) (S13); when NACK, Offset_Com is incremented according to EQ. (5) (S14).

$$\text{Offset\_Com}(u)[dB]=\text{Offset\_Com}(u)-\text{Delta\_Down} \quad \text{EQ. (4)}$$

$$\text{Offset\_Com}(u)[dB]=\text{Offset\_Com}(u)+\text{Delta\_Up} \quad \text{EQ. (5)}$$

Delta_Down and Delta_Up represent decrement and increment step sizes, respectively. Delta_Down is an input parameter. Delta_Up is calculated using Delta_Down according to EQ. (6) below. T_Bler designates a preset target reception error rate.

$$\text{Delta\_Up}=T\_\text{Bler}/(1-T\_\text{Bler})*\text{Delta\_Down} \quad \text{EQ. (6)}$$

Next, an operation in a case wherein the adjacent cell for the terminal that has transmitted reception decision information has an ABS configured (S11, Yes) will be described. In case that the ABS is configured, a decision is made as to whether the terminal that has transmitted reception decision information is a terminal supporting Release 10 (S15).

In case that the terminal is not a terminal supporting Release 10 (S15, No), and when reception decision is ACK (S16, Yes) and is of Transport Block transmitted with the ABS (S17, Yes), Offset_ABS is decremented according to EQ. (7) (S18); when reception decision is not of Transport Block transmitted with the ABS (S17, No), Offset_NonABS is decremented according to EQ. (8) (S19):

$$\text{Offset\_ABS}(u)[dB]=\text{Offset\_ABS}(u)-\text{Delta\_Down} \quad \text{EQ. (7)}$$

$$\text{Offset\_NonABS}(u)[dB]=\text{Offset\_NonABS}(u)-\text{Delta\_Down} \quad \text{EQ. (8)}$$

When reception decision is NACK (S16, No) and is of Transport Block transmitted with the ABS (S20, Yes), Offset_ABS is incremented according to EQ. (9) (S21); when reception decision is not of Transport Block transmitted with the ABS (S20, No), Offset_NonABS is incremented according to EQ. (10) (S22).

$$\text{Offset\_ABS}(u)[dB]=\text{Offset\_ABS}(u)+\text{Delta\_Up} \quad \text{EQ. (9)}$$

$$\text{Offset\_NonABS}(u)[dB]=\text{Offset\_NonABS}(u)+\text{Delta\_Up} \quad \text{EQ. (10)}$$

On the other hand, in case that the terminal that has transmitted reception decision information is a terminal supporting Release 10 (S15, Yes), and when reception decision is ACK (S23, Yes), Offset_Com is decremented according to EQ. (4) (S24); when NACK (S23, No), Offset_Com is incremented according to EQ. (5) (S25).

Figure 4:
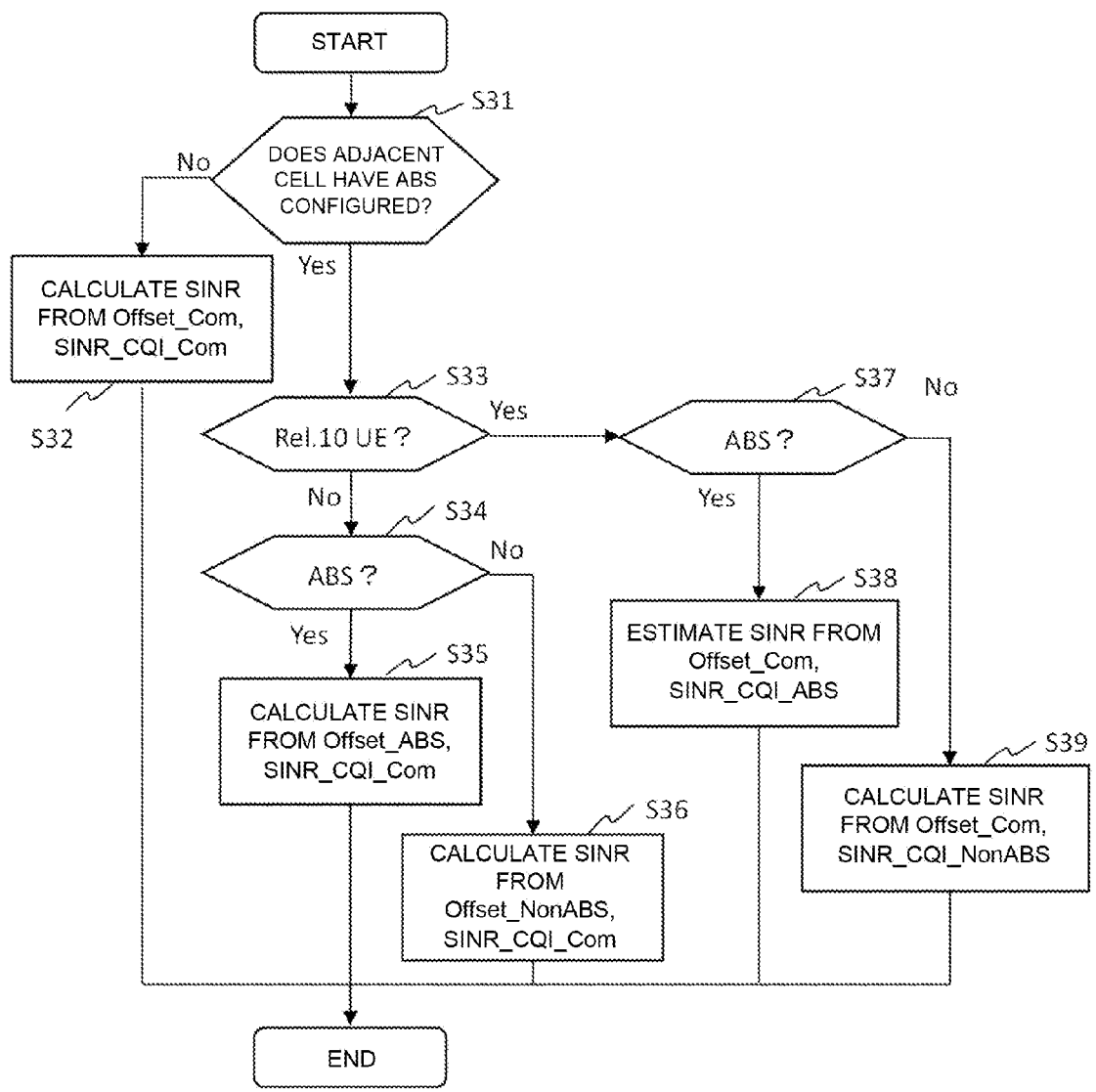
FIG. 4 A flow chart showing processing of OLLA-based SINR estimation in the first embodiment.

FIG. 4 shows a procedure of an operation of the channel quality estimating section 105 for estimating an SINR for a terminal. This operation is conducted for a subframe to which the scheduler applies PRB allocation processing.

First, the channel quality estimating section 105 decides whether an adjacent cell for a terminal of interest for which an SINR is estimated has an ABS configured (S31). In case that the adjacent cell for the terminal of interest does not have an ABS configured (S31, No), an estimated SINR value (SINR_Est) is calculated according to EQ. (11) (S32). SINR_CQI_Com [dB] is an SINR corresponding to a CQI.

$$\text{SINR\_Est}(u)[dB]=\text{SINR\_CQI\_Com}(u)+\text{Offset\_Com}(u) \quad \text{EQ. (11)}$$

In case that the adjacent cell for the terminal of interest has an ABS configured (S31, Yes), a decision is made as to whether the terminal is a terminal supporting Release 10 (S33). For a terminal not supporting Release 10 (S33, No), when the currently transmitted Subframe is the ABS (S34, Yes), Offset_ABS is used to calculate SINR_Est according to EQ. (12) (S35); when not the ABS (S34, No), Offset_NonABS is used to calculate SINR_Est according to EQ. (13) (S36).

$$\text{SINR\_Est}(u)[dB]=\text{SINR\_CQI\_Com}(u)+\text{Offset\_ABS}(u) \quad \text{EQ. (12)}$$

$$\text{SINR\_Est}(u)[dB]=\text{SINR\_CQI\_Com}(u)+\text{Offset\_NonABS}(u) \quad \text{EQ. (13)}$$

On the other hand, for a terminal supporting Release 10 (S33, Yes), when the currently transmitted Subframe is an ABS (S37, Yes), an SINR corresponding to a CQI of a measurement subframe set with the ABS (SINR_CQI_ABS) is used to calculate an SINR according to EQ. (14) (S38); when not the ABS (S37, No), an SINR corresponding to a CQI of a measurement subframe set with a Non-ABS (SINR_CQI_NonABS) is used to calculate the SINR according to EQ. (15) (S39).

$$SINR\_Est(u)[dB]=SINR\_CQI\_ABS(u)+Offset\_Com(u) \quad \text{EQ. (14)}$$

$$SINR\_Est(u)[dB]=SINR\_CQI\_NonABS(u)+Offset\_Com(u) \quad \text{EQ. (15)}$$

Figure 5:
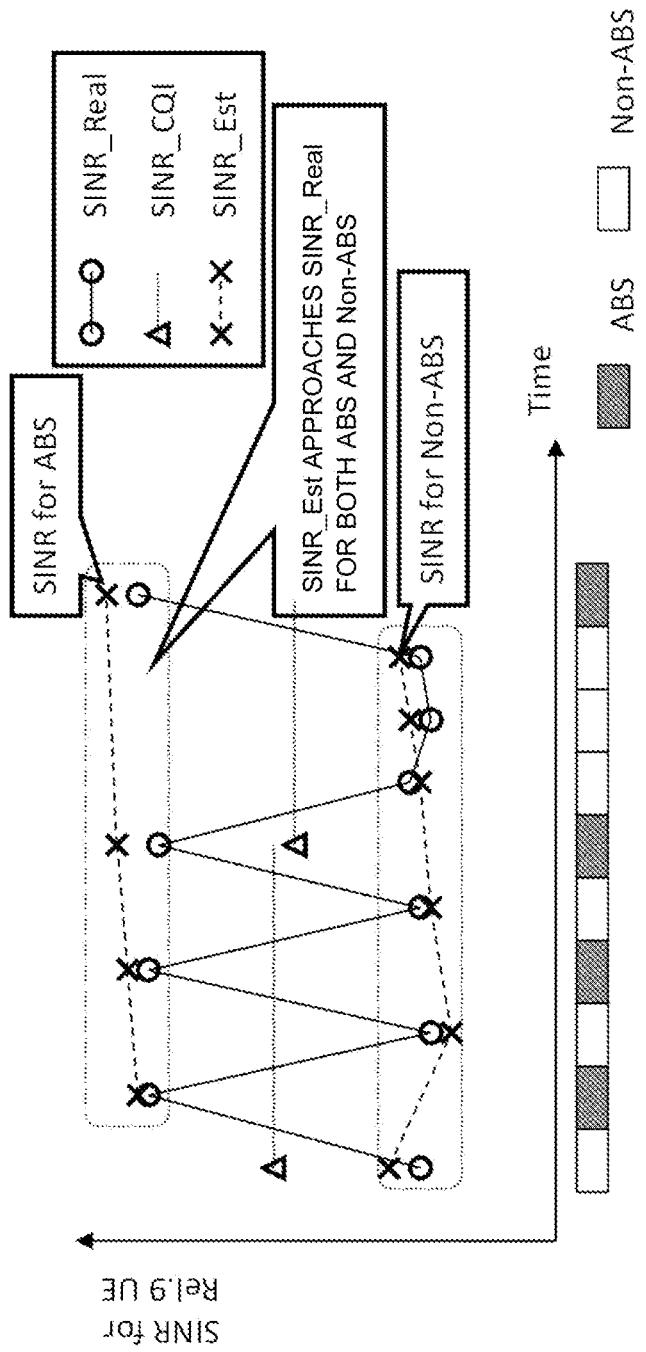
FIG. 5 An exemplary graph of a result of SINR estimation in the first embodiment.

By practicing the present embodiment, as shown in FIG. 5, the throughput for a terminal not supporting Release 10 is improved because precision in SINR estimation for the terminal not supporting Release 10 is enhanced both for the ABS and the Non-ABS. Moreover, as it is improved, the system capacity of a base station is improved.

While in this embodiment, a preset default value is used for an OLLA Offset initial value in FIG. 2, the present invention is not limited thereto, and a statistical value for currently connecting terminals may be used, for example. In particular, an average value or a 50% value of Offsets of the currently connecting terminals or the like may be used. Then, reduction in the Offset convergence time can be expected.

Moreover, while in this embodiment, in FIG. 3, Offset is always incremented/decremented according to reception decision information (ACK, NACK) received from a terminal, the present invention is not limited thereto, and upper and lower limit values for Offset may be defined. Then, excessively small/large estimated SINR values due to a transient increase/decrease of the interference power may be suppressed.

Second Embodiment

Next, a second embodiment of the present invention will be described. While in the first embodiment, a plurality of OLLA Offsets are prepared only for a terminal not supporting Release 10, such a plurality of Offsets are prepared for all terminals including those supporting Release 10 in the present embodiment.

[Configuration]

A block diagram representing a configuration of a wireless communications system in the present embodiment is similar to that in the first embodiment.

[Operation]

Figure 6:
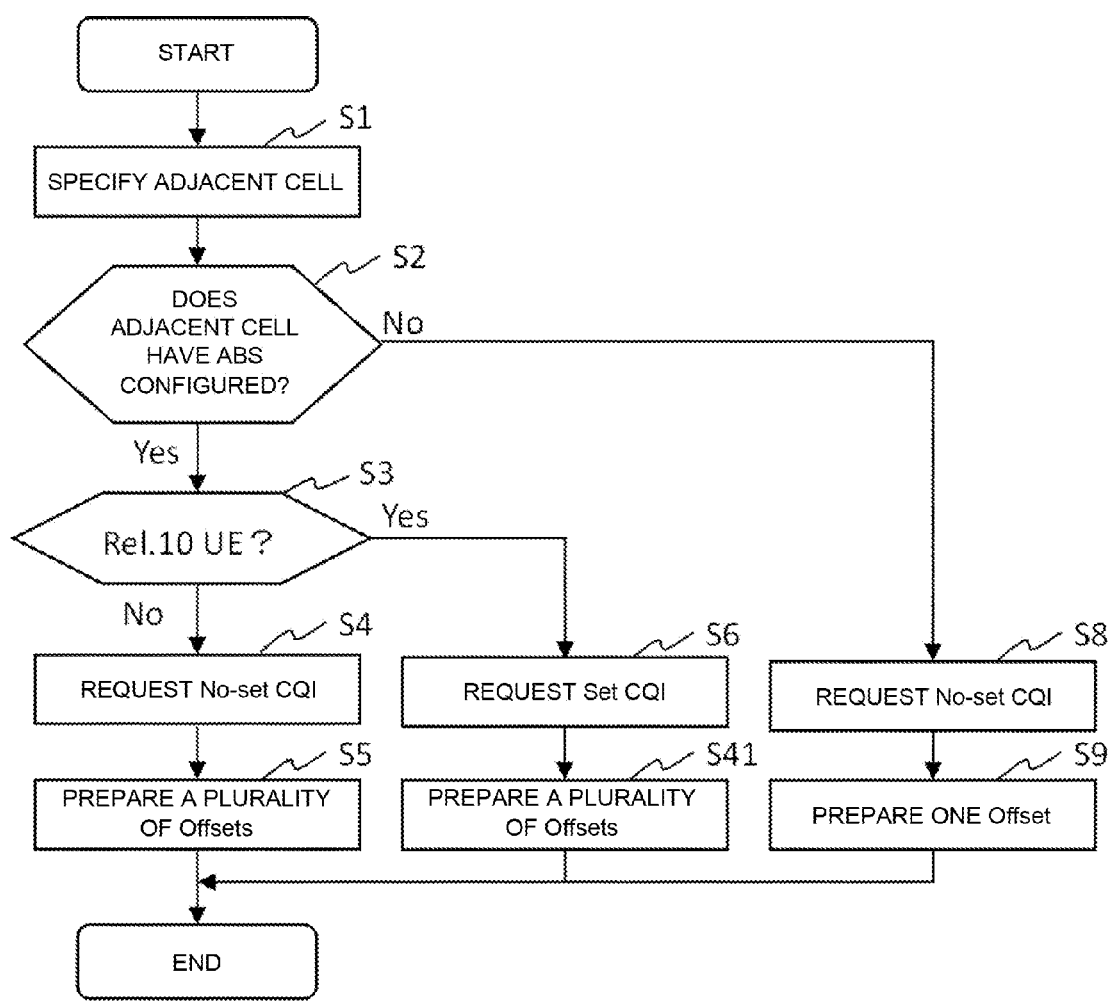
FIG. 6 A flow chart showing processing of decision of an adjacent cell, prescription of a method of reporting a CQI for a terminal, and setting of an initial value of an OLLA offset in a second embodiment.

Next, an operation of the present embodiment will be described with reference to FIGS. 6, 7, and 8. FIG. 6 shows a procedure of operations of the channel quality estimating section 105 for deciding upon an adjacent cell, prescribing a method of reporting a CQI for a terminal, and setting an OLLA initial value.

Referring to FIG. 6, S7 in FIG. 2 of the first embodiment is replaced with S41. Specifically, in case that an adjacent cell for a terminal has an ABS configured (S2, Yes), and that the terminal is a terminal supporting Release 10 (S3, Yes), the channel quality estimating section 105 prepares a plurality of OLLA Offsets for the current terminal according to EQs. (1) and (2) (S41), as in the processing at S5 for a terminal not supporting Release 10.

Figure 7:
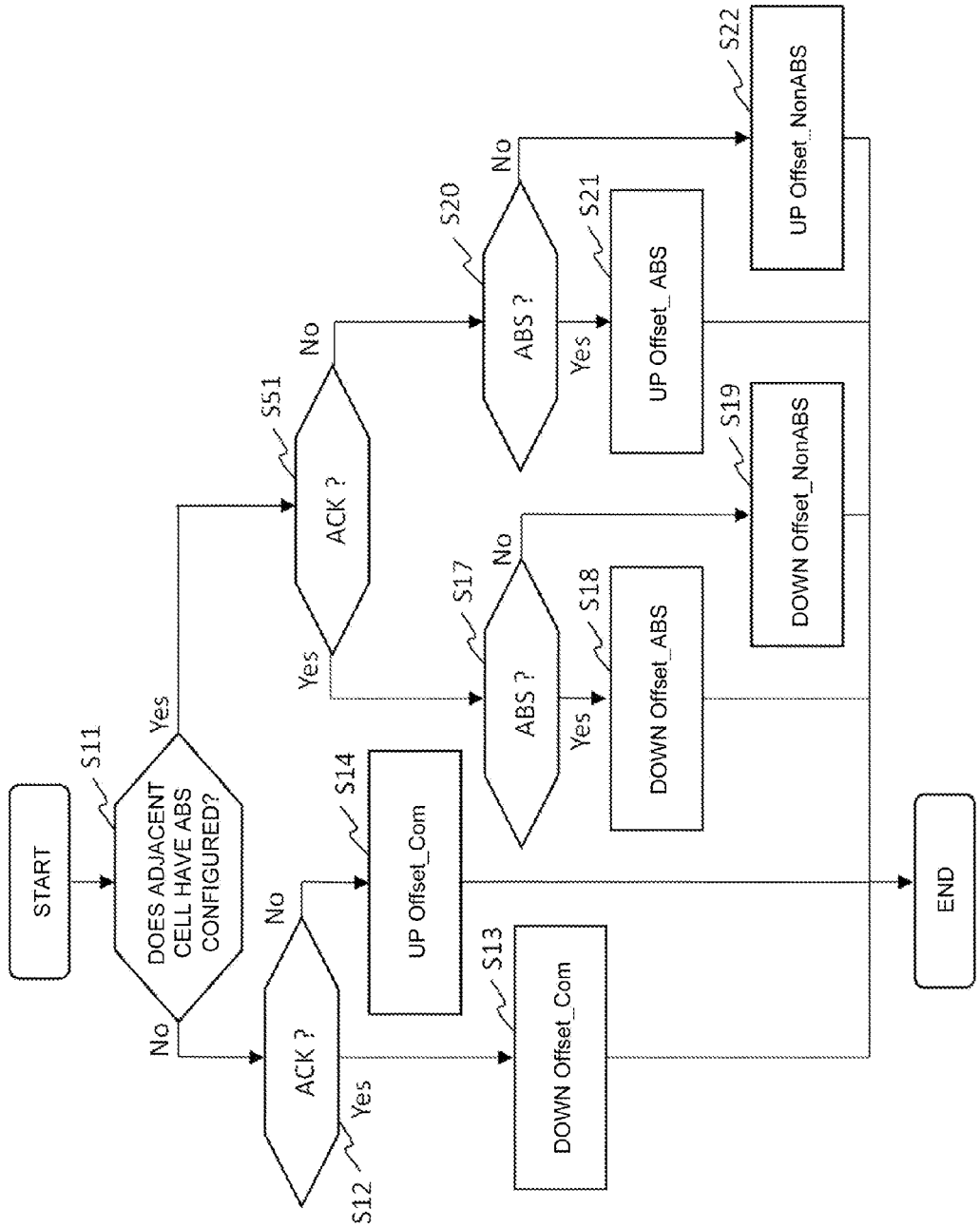
FIG. 7 A flow chart showing processing of updating the OLLA offset in the second embodiment.

FIG. 7 shows a procedure of an operation of the channel quality estimating section 105 for updating an OLLA offset for a terminal. Referring to FIG. 7, S23, S24, and S25 in FIG. 3 of the first embodiment are eliminated and S15 and S16 are replaced with S51. Specifically, when an adjacent cell for a terminal has an ABS configured (S11, Yes), a decision is made as to whether reception decision is ACK or NACK; when ACK (S51, Yes), the flow goes to the processing at S17, and when NACK (S51, No), goes to the processing at S20.

Figure 8:
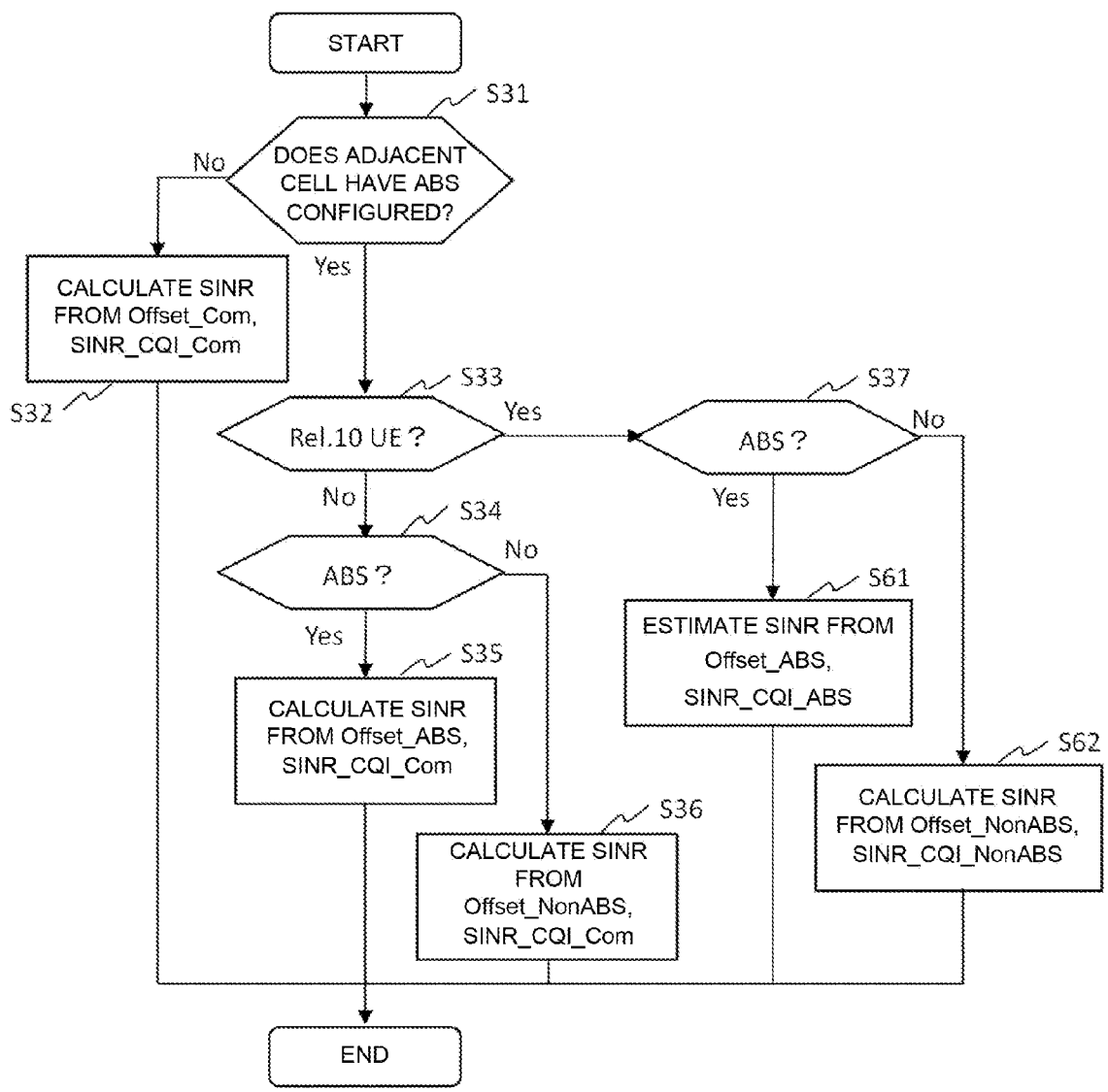
FIG. 8 A flow chart showing processing of OLLA-based SINR estimation in the second embodiment.

FIG. 8 shows a procedure of an operation of the channel quality estimating section 105 for estimating an SINR of a terminal Referring to FIG. 8, S38 and S39 in FIG. 4 of the first embodiment are replaced with S61, S62, respectively. Specifically, for a terminal supporting Release 10 (S33, Yes), when the currently transmitted subframe is an ABS (S37, Yes), SINR_CQI_ABS and Offset_ABS are used to calculate the SINR according to EQ. (16) (S61); when not the ABS (S37, No), SINR_CQI_NonABS and Offset_NonABS are used to calculate the SINR according to EQ. (17) (S62).

$$SINR\_Est(u)[dB]=SINR\_CQI\_ABS(u)+Offset\_ABS(u) \quad \text{EQ. (16)}$$

$$SINR\_Est(u)[dB]=SINR\_CQI\_NonABS(u)+Offset\_NonABS(u) \quad \text{EQ. (17)}$$

By practicing the present embodiment, when the amount of variation of an interference level is different between the ABS and a Non-ABS, the level of the variation can be corrected individually for the ABS and the Non-ABS by preparing a plurality of Offsets for a Release 10 terminal, and therefore, the throughput of a terminal supporting Release 10 can also be improved. Moreover, as it is improved, the system capacity of a base station can be further improved.

Moreover, while in this embodiment, a plurality of Offsets are prepared for all terminals, the present invention is not limited thereto, and such a plurality of Offsets may be applied only to terminals in which the level of variation of interference relative to a desired signal significantly varies when comparing the ABS and the Non-ABS, for example. Thus, reduction of the memory space and maintenance of the effect can be achieved together. In particular, such a plurality of Offsets may be applied to terminals having a difference between RSRP (RSRP_Own) of its cell and RSRP (RSRP_Adj) of an adjacent cell (RSRP_Own−RSRP_Adj) that is less than a prespecified threshold. Moreover, the CQI may be used. Furthermore, when it is possible to acquire the power levels of interference in the ABS and the Non-ABS, a difference between them may be used. Similar configurations and operations may be applied to the First Embodiment.

Third Embodiment

Next, a third embodiment of the present invention will be described. While in the first and second embodiments, an LTE downlink is exemplified, an uplink is taken up as an example in the present embodiment.

[Configuration]

Figure 9:
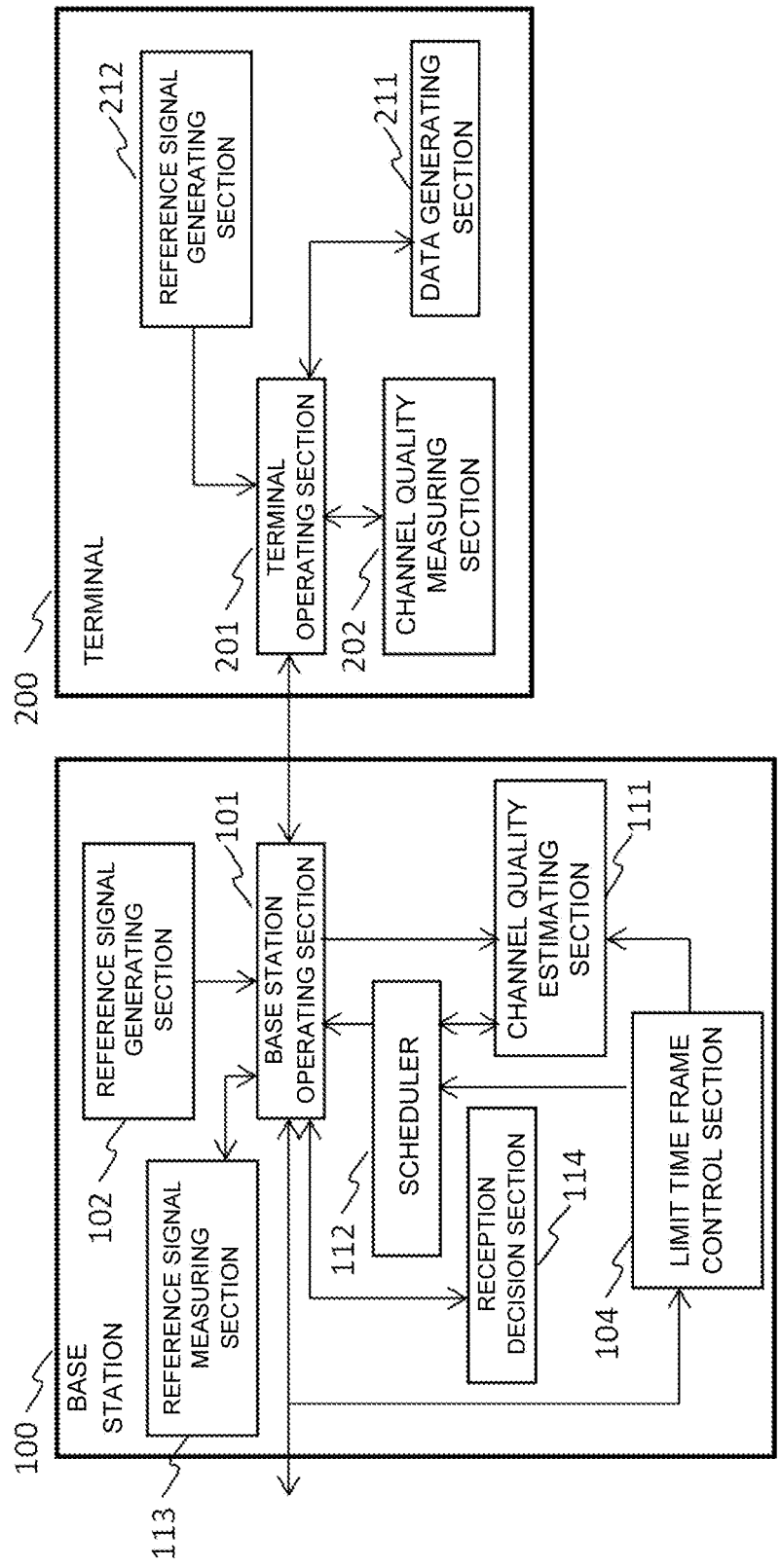
FIG. 9 A block diagram showing a configuration of a wireless communications system in a third embodiment.

FIG. 9 is a block diagram showing a configuration of a wireless communications system in the third embodiment of the present invention. Referring to FIG. 9, the wireless communications system comprises a base station 100 and a terminal 200, as with FIG. 1. The base station 100 is a wireless communication apparatus for wireless communicating with the terminal 200 lying in a communication area of the base station 100 via a wireless channel, and is also connected with a network (not shown) and is capable of making data communications with surrounding base stations.

The base station 100 comprises main functional sections including a base station operating section 101, a reference signal generating section 102, a limit time frame control section 104, a channel quality estimating section 111, a scheduler 112, a reference signal measuring section 113, and a reception decision section 114.

The base station operating section 101 has the same function as that of the first embodiment, description of which will be therefore omitted herein.

The reference signal generating section 102 has the same function as that of the first embodiment, description of which will be therefore omitted herein.

The limit time frame control section 104 has the same function as that of the first embodiment, description of which will be therefore omitted herein.

The channel quality estimating section 111 has a function of estimating an SINR for the terminal 200 based on OLLA from UE Capability information for the terminal 200 using the SINR retained in the reference signal measuring section 113, and a function of deciding an adjacent base station cell (referred to as an adjacent cell hereinbelow) from RSRP information received from the terminal.

The scheduler 112 has a function of determining a PRB and a TBS Index to be allocated to a terminal based on the estimated SINR, and transmitting a result of the allocation to the terminal 200 as scheduling information.

The reference signal measuring section 113 has a function of measuring communication channel quality such as an SINR from a reference signal received from the terminal 200. Although it also has a function of correcting any difference between the transmission powers of the reference signal and a signal transmitting data from the data generating section 211, the present embodiment assumes that the transmission powers are not different.

The reception decision section 114 has a function of conducting reception decision (ACK, NACK) for transmission data received from the terminal 200, and notifying the reception decision information to the channel quality estimating section 111 via the base station operating section 101.

The terminal 200 comprises main functional sections including a terminal operating section 201, a channel quality measuring section 202, a data generating section 211, and a reference signal generating section 212.

The terminal operating section 201 has the same function as that of the first embodiment, description of which will be therefore omitted herein. It has functions equivalent to those of common terminals, including a function of transmitting data accumulated in the data generating section 211 based on scheduling information received from the base station.

The channel quality measuring section 202 has the same function as that of the first embodiment, description of which will be therefore omitted herein.

The data generating section 211 has a function of generating data to be transmitted by the terminal 200, and accumulating it along with management information such as a time of generation. The data is transmitted to the base station 100 via the terminal operating section 201 based on the scheduling information received from the base station 100.

The reference signal generating section 212 has a function of transmitting a reference signal for measuring communication channel quality at the base station 100 to the base station 100 via the terminal operating section 201 at certain times.

[Operation]

Figure 10:
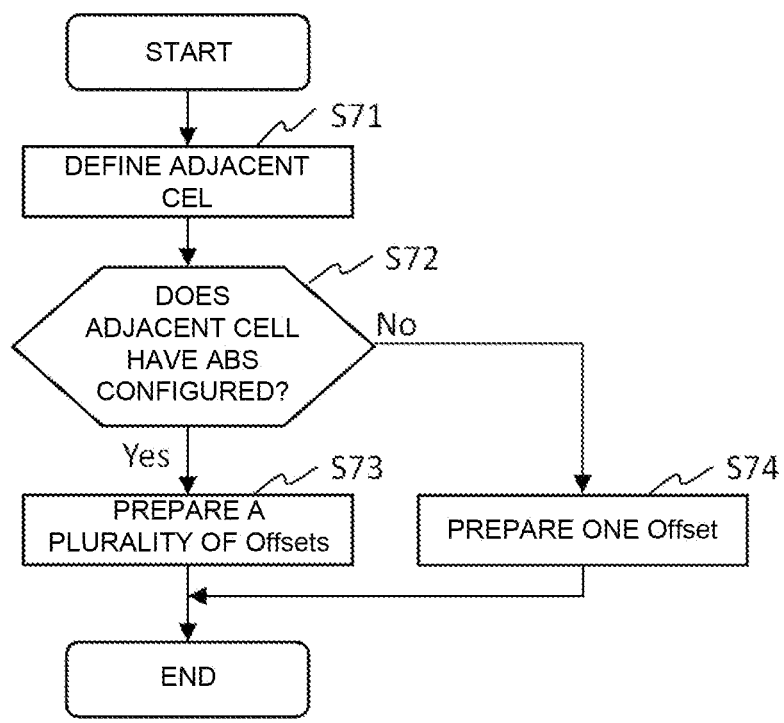
FIG. 10 A flow chart showing processing of decision of an adjacent cell, and setting of an initial value of an OLLA offset in the third embodiment.

Next, an operation of the present embodiment will be described with reference to FIGS. 10 and 11. FIG. 10 shows a procedure of operations of the channel quality estimating section 111 for deciding an adjacent cell and setting an OLLA initial value.

First, the channel quality estimating section 111 determines an adjacent cell for the terminal from RSRP received from the terminal (S71). Since an uplink is assumed in this embodiment, a surrounding cell having the highest path loss is defined as an adjacent cell, where the path loss is a difference between the transmission and reception powers for the reference signal.

Next, a decision is made as to whether the adjacent cell for the terminal has an ABS configured (S72). In case that the ABS is configured (S72, Yes), a plurality of OLLA Offsets are prepared for the current terminal (S73), and the processing is terminated. As with the first embodiment, two kinds of Offsets are set for the ABS and a Non-ABS according to EQs. (1) and (2) in this embodiment. When no ABS is configured (S72, No), one kind of Offset is set according to EQ. (3) (S74).

A procedure of an operation of updating the OLLA offset for a terminal is similar to that in the second embodiment shown in FIG. 7. While in the second embodiment, reception decision information transmitted by a terminal is used because a downlink is assumed, the present embodiment is different therefrom only in that reception decision information (ACK, NACK) in the reception decision section 114 is used because an uplink is assumed.

Figure 11:
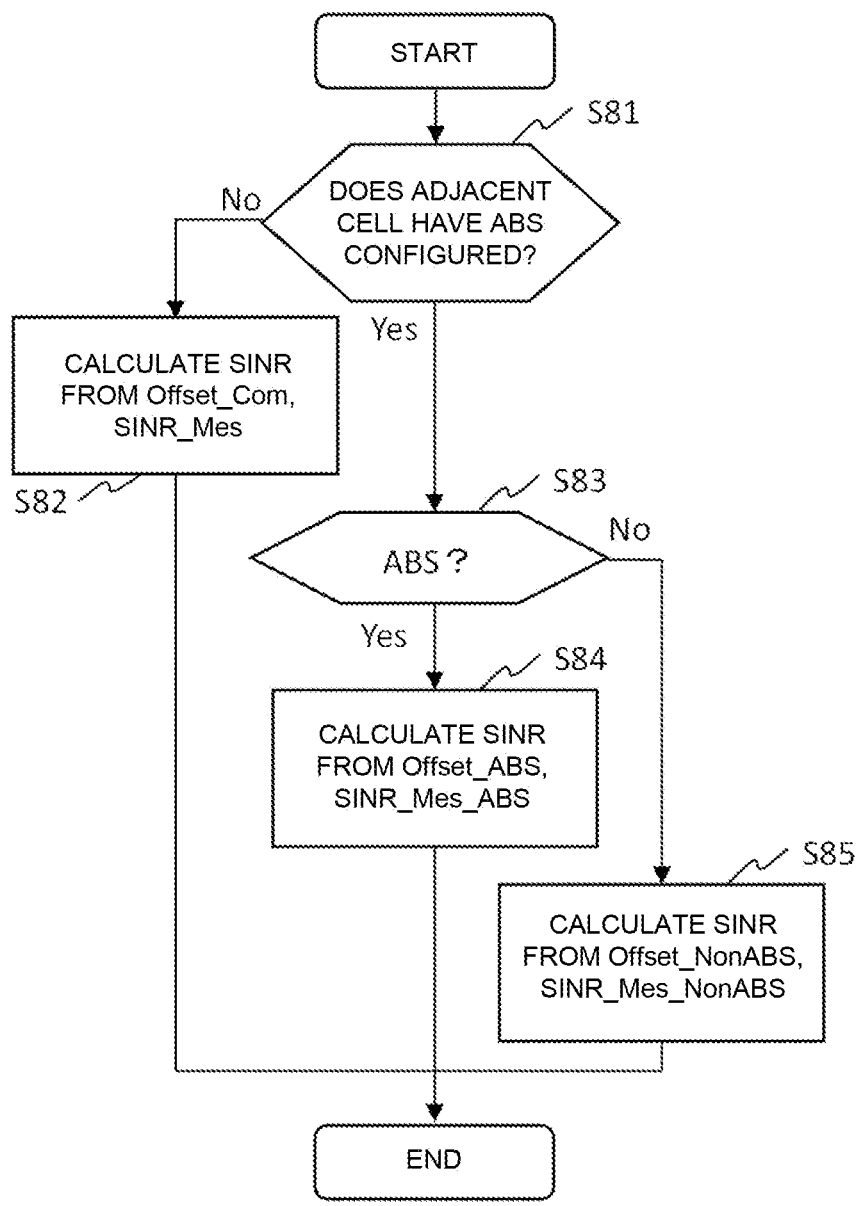
FIG. 11 A flow chart showing processing of OLLA-based SINR estimation in the third embodiment.

FIG. 11 shows a procedure of an operation of the channel quality estimating section 111 for estimating an SINR of a terminal.

First, the channel quality estimating section 111 decides whether an adjacent cell for the terminal of interest for which the SINR is estimated has the ABS configured (S81). In case that the adjacent cell for the terminal of interest does not have the ABS configured (S81, No), an estimated SINR value (SINR_Est) is calculated according to EQ. (16) (S82). SINR_Mes [dB] is an SINR measured from a transmission signal from the terminal.

$$\text{SINR\_Est}(u)[\text{dB}] = \text{SINR\_Mes}(u) + \text{Offset\_Com}(u) \qquad \text{EQ. (16)}$$

On the other hand, in case that the adjacent cell for the terminal of interest has an ABS configured (S81, Yes), and when the currently transmitted subframe is the ABS (S83, Yes), Offset_ABS is used to calculate SINR_Est according to EQ. (17) (S84); when not the ABS (S83, No), Offset_NonABS is used to calculate SINR_Est according to EQ. (18) (S85). SINR_Mes_ABS and SINR_Mes_NonABS represent an SINR measured in the ABS and that measured in the Non-ABS, respectively.

$$\text{SINR\_Est}(u)[\text{dB}] = \text{SINR\_Mes\_ABS}(u) + \text{Offset\_ABS}(u) \qquad \text{EQ. (17)}$$

$$\text{SINR\_Est}(u)[\text{dB}] = \text{SINR\_Mes\_NonABS}(u) + \text{Offset\_NonABS}(u) \qquad \text{EQ. (18)}$$

Other Embodiments

While several embodiments of the present invention have been described above, the present invention is not limited to these embodiments.

Figure 12:
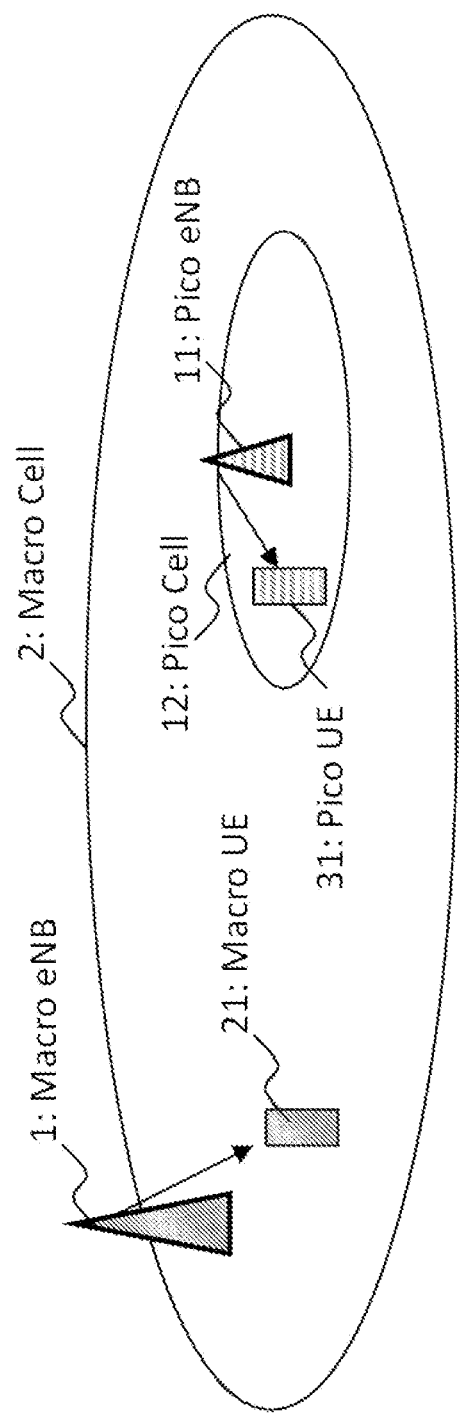
FIG. 12 An exemplary configuration of a heterogeneous network.
Figure 13:
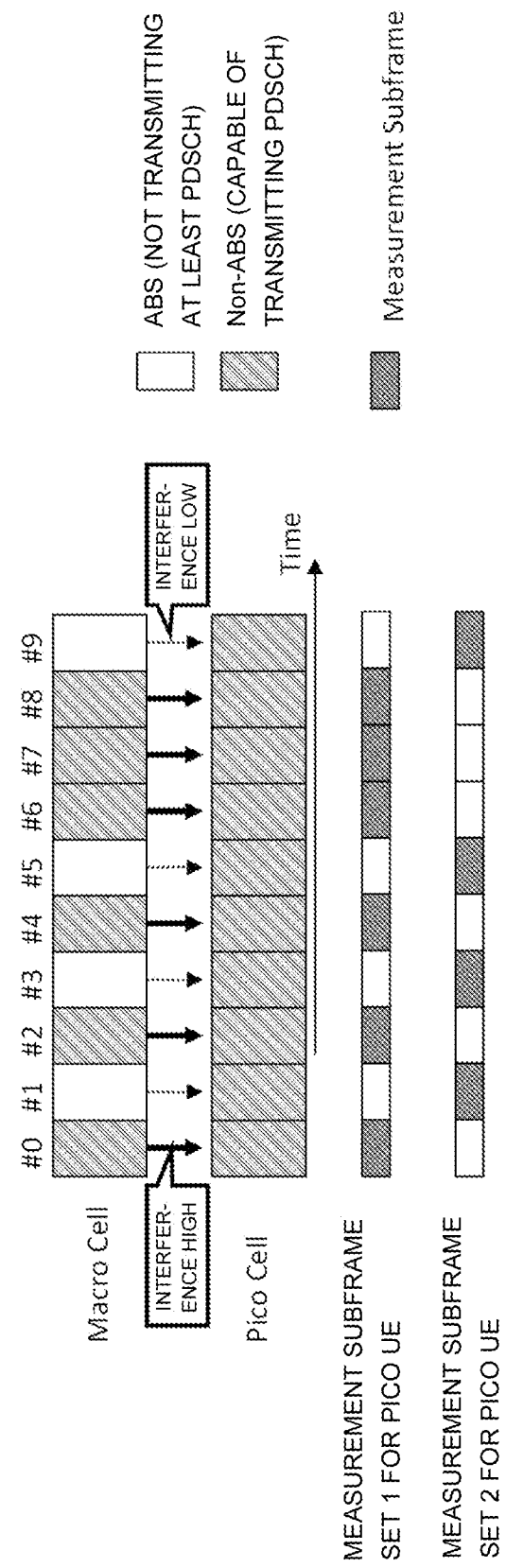
FIG. 13 An exemplary ABS configuration.
Figure 14:
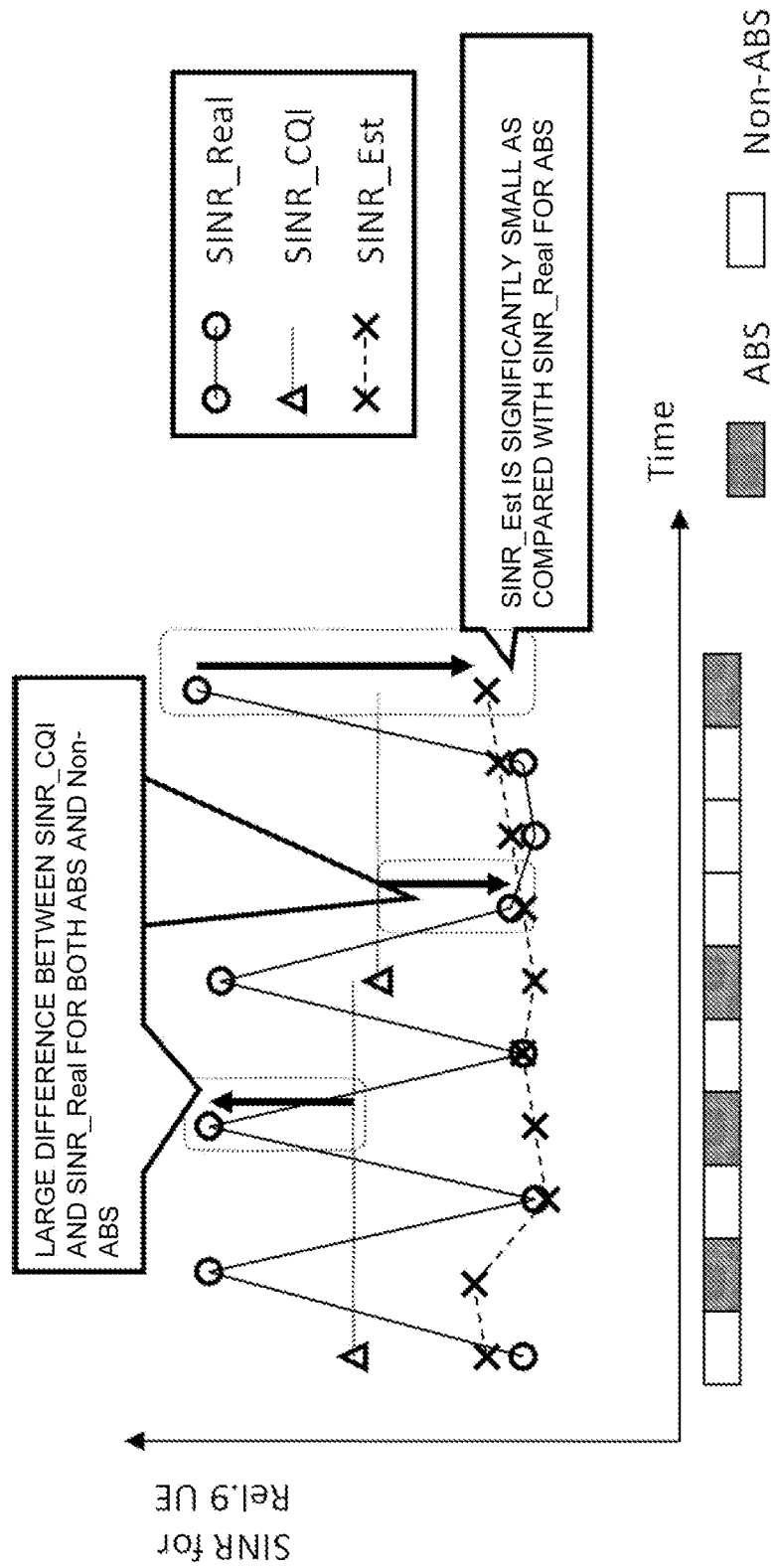
FIG. 14 An exemplary graph of a result of SINR estimation.

For example, while RSRP is used as a criterion of decision of an adjacent cell for a terminal, a ratio of the total reception power to the reception power of a reference signal (RSRQ: Reference Signal Received Quality) may be used. Moreover, a CQI or an SINR may be used. Further, in case that the current base station is in a pico cell, an adjacent cell may be a macro cell whose communication area overlaps, as shown in FIG. 12. Furthermore, there is a concern about interference that a femto cell, which is an indoor small base station, may have upon an outdoor large base station such as a macro cell, so that it is contemplated that an ABS is applied to the femto cell. In this case, an adjacent cell is a small cell such as a femto cell whose communication area overlaps.

Moreover, the present invention may be applied to a system comprised of a plurality of devices, or to a single apparatus. Furthermore, the present invention may be applied to a case in which programs implementing the functions described in the embodiments above are supplied from the system or from a remote system to execute processing of the operation procedures described in these embodiments. Therefore, programs installed in a base station and executed by a processor in the base station, media storing therein the programs, and servers for downloading the programs therefrom for implementing the functions of the present invention in the base station may fall within the scope of the present invention.

(Appendix 1)

A quality estimating method for a communication channel used by a base station for wireless communicating with a terminal within a communication area, characterized in comprising:

a step of acquiring quality information for a communication channel between said base station and said terminal;

a step of acquiring reception error information relating to a reception error in a data communication using said communication channel;

a step of acquiring information on a transmission limit time frame defined by a base station adjacent to said base station; and an estimating step of updating a corrective value according to the definition in said transmission limit time frame information and said reception error information, and estimating quality of said communication channel using said corrective value and said acquired quality information.

(Appendix 2)

The communication channel quality estimating method as recited in appendix 1, characterized in that said estimating step comprises:

a step of updating a first corrective value according to said reception error by a communication in said limit time frame, and updating a second corrective value according to said reception error by a communication in a time frame that is not said limit time frame; and a calculating step of calculating, in the communication in said limit time frame, quality of a communication channel using said acquired quality information for the communication channel and said first corrective value, and calculating, in the communication in a time frame that is not said limit time frame, quality of a communication channel using said acquired quality information for the communication channel and said second corrective value.

(Appendix 3)

The communication channel quality estimating method as recited in appendix 2, characterized in that, in said calculation of the quality of the communication channel, said calculating step uses, for said limit time frame, quality information for the communication channel information in said limit time frame, and uses, for the time frame that is not said limit time frame, quality of the communication channel in the time frame that is not said limit time frame.

(Appendix 4)

The communication channel quality estimating method as recited in appendix 2, characterized in that said calculating step comprises:

a step of summing up said first and second corrective values for currently connecting terminals; and a step of determining initial values of said first and second corrective values from said summed up first and second corrective values for said terminals.

(Appendix 5)

The communication channel quality estimating method as recited in appendix 2, characterized in that the initial values of said first and second corrective values are defined as respective prespecified initial values.

(Appendix 6)

The communication channel quality estimating method as recited in any one of appendices 1 to 5, characterized in that: said wireless communication is a downlink data communication.

(Appendix 7)

The communication channel quality estimating method as recited in any one of appendices 1 to 5, characterized in that said wireless communication is an uplink data communication.

(Appendix 8)

The communication channel quality estimating method as recited in any one of appendices 1 to 7, characterized in that said adjacent base station is a base station determined based on communication channel quality information for a communication area of said adjacent base station.

(Appendix 9)

The communication channel quality estimating method as recited in any one of appendices 1 to 7, characterized in that said adjacent base station is defined as a base station having a communication area that overlaps that of said base station and has an area greater than that of said base station.

(Appendix 10)

The communication channel quality estimating method as recited in any one of appendices 1 to 7, characterized in that said adjacent base station is defined as a base station having a communication area that overlaps that of said base station and has an area smaller than that of said base station.

(Appendix 11)

The communication channel quality estimating method as recited in any one of appendices 1 to 10, characterized in that said terminal is a terminal having a difference or a ratio between a level of interference received in said limit time frame and that received in a time frame that is not said limit time frame that is equal to or lower than a threshold.

(Appendix 12)

A wireless communications system in which a base station wireless communicates with a terminal within a communication area, said system characterized in comprising:

means for acquiring quality information for a communication channel between said base station and said terminal;

means for acquiring reception error information relating to a reception error in a data communication using said communication channel;

means for acquiring information on a transmission limit time frame defined by a base station adjacent to said base station; and estimating means for updating a corrective value according to the definition in said transmission limit time frame information and said reception error information, and estimating quality of said communication channel using said corrective value and said acquired quality information.

(Appendix 13)

The wireless communications system as recited in appendix 12, characterized in that said estimating means comprises:

updating means for updating a first corrective value according to said reception error by a communication in said limit time frame, and updating a second corrective value according to said reception error by a communication in a time frame that is not said limit time frame; and calculating means for calculating, in the communication in said limit time frame, quality of a communication channel using said acquired quality information for the communication channel and said first corrective value, and calculating, in the communication in a time frame that is not said limit time frame, quality of a communication channel using said acquired quality information for the communication channel and said second corrective value.

(Appendix 14)

The wireless communications system as recited in appendix 13, characterized in that, in said calculation of the quality of the communication channel, said calculating means uses, for said limit time frame, quality information for the communication channel information in said limit time frame, and uses, for the time frame that is not said limit time frame, quality of the communication channel in the time frame that is not said limit time frame.

(Appendix 15)

The wireless communications system as recited in appendix 13, characterized in that said calculating means comprises:

means for summing up said first and second corrective values for currently connecting terminals; and means for determining initial values of said first and second corrective values from said summed up first and second corrective values for said terminals.

(Appendix 16)

The wireless communications system as recited in appendix 13, characterized in that the initial values of said first and second corrective values are defined as respective prespecified initial values.

(Appendix 17)

The wireless communications system as recited in any one of appendices 12 to 16, characterized in that said wireless communication is a downlink data communication.

(Appendix 18)

The wireless communications system as recited in any one of appendices 12 to 16, characterized in that said wireless communication is an uplink data communication.

(Appendix 19)

The wireless communications system as recited in any one of appendices 12 to 18, characterized in that said adjacent base station is a base station determined based on communication channel quality information for a communication area of said adjacent base station.

(Appendix 20)

The wireless communications system as recited in any one of appendices 12 to 18, characterized in that said adjacent base station is defined as a base station having a communication area that overlaps that of said base station and has an area greater than that of said base station.

(Appendix 21)

The wireless communications system as recited in any one of appendices 12 to 18, characterized in that said adjacent base station is defined as a base station having a communication area that overlaps that of said base station and has an area smaller than that of said base station.

(Appendix 22)

The wireless communications system as recited in any one of appendices 12 to 21, characterized in that said terminal is a terminal having a difference or a ratio between a level of interference received in said limit time frame and that received in a time frame that is not said limit time frame that is equal to or lower than a threshold.

(Appendix 23)

A base station for wireless communicating with a terminal within its communication area, said base station characterized in comprising:

means for acquiring quality information for a communication channel between said base station and said terminal;

means for acquiring reception error information relating to a reception error in a data communication using said communication channel;

means for acquiring information on a transmission limit time frame defined by a base station adjacent to said base station; and estimating means for updating a corrective value according to the definition in said transmission limit time frame information and said reception error information, and estimating quality of said communication channel using said corrective value and said acquired quality information.

(Appendix 24)

The base station as recited in appendix 23, characterized in that said estimating means comprises:

updating means for updating a first corrective value according to said reception error by a communication in said limit time frame, and updating a second corrective value according to said reception error by a communication in a time frame that is not said limit time frame; and calculating means for calculating, in the communication in said limit time frame, quality of a communication channel using said acquired quality information for the communication channel and said first corrective value, and calculating, in the communication in a time frame that is not said limit time frame, quality of a communication channel using said acquired quality information for the communication channel and said second corrective value.

(Appendix 25)

The base station as recited in appendix 24, characterized in that, in said calculation of the quality of the communication channel, said calculating means uses, for said limit time frame, quality information for the communication channel information in said limit time frame, and uses, for the time frame that is not said limit time frame, quality of the communication channel in the time frame that is not said limit time frame.

(Appendix 26)

The base station as recited in appendix 24, characterized in that said calculating means comprises:

said calculating means comprises:

means for summing up said first and second corrective values for currently connecting terminals; and means for determining initial values of said first and second corrective values from said summed up first and second corrective values for said terminals.

(Appendix 27)

The base station as recited in appendix 24, characterized in that the initial values of said first and second corrective values are defined as respective prespecified initial values.

(Appendix 28)

The base station as recited in any one of appendices 23 to 27, characterized in that said wireless communication is a downlink data communication.

(Appendix 29)

The base station as recited in any one of appendices 23 to 27, characterized in that said wireless communication is an uplink data communication.

(Appendix 30)

The base station as recited in any one of appendices 23 to 29, characterized in that said adjacent base station is a base station determined based on communication channel quality information for a communication area of said adjacent base station.

(Appendix 31)

The base station as recited in any one of appendices 23 to 29, characterized in that said adjacent base station is defined as a base station having a communication area that overlaps that of said base station and has an area greater than that of said base station.

(Appendix 32)

The base station as recited in any one of appendices 23 to 29, characterized in that said adjacent base station is defined as a base station having a communication area that overlaps that of said base station and has an area smaller than that of said base station.

(Appendix 33)

The base station as recited in any one of appendices 23 to 32, characterized in that said terminal is a terminal having a difference or a ratio between a level of interference received in said limit time frame and that received in a time frame that is not said limit time frame that is equal to or lower than a threshold.

(Appendix 34)

A program for a base station for wireless communicating with a terminal within its communication area, said program characterized in causing said base station to function as:

means for acquiring quality information for a communication channel between said base station and said terminal;

means for acquiring reception error information relating to a reception error in a data communication using said communication channel;

means for acquiring information on a transmission limit time frame defined by a base station adjacent to said base station; and estimating means for updating a corrective value according to the definition in said transmission limit time frame information and said reception error information, and estimating quality of said communication channel using said corrective value and said acquired quality information.

The present application claims priority based on Japanese Patent Application No. 2012-073287 filed on Mar. 28, 2012, disclosure of which is incorporated herein in its entirety.

REFERENCE SIGNS LIST

100 Base station
101 Base station operating section
102 Reference signal generating section
103 Transmission buffer
104 Limit time frame control section
105 Channel quality estimating section
106 Scheduler
111 Channel quality estimating section
112 Scheduler
113 Reference signal measuring section
114 Reception decision section
200 Terminal
201 Terminal operating section
202 Channel quality measuring section
203 Reception decision section
211 Data generating section
212 Reference signal generating section

The invention claimed is:

1. A quality estimating method for a communication channel used by a base station for wireless communicating with a terminal within a communication area, the method comprising:

acquiring quality information for a communication channel between said base station and said terminal;

acquiring transmission and reception error information relating to a transmission and reception error in a data communication using said communication channel and determining from the transmission and reception error information whether an acknowledgement (ACK) is received or a negative acknowledgement (NACK) is received;

acquiring information on a transmission limit time frame defined by a base station adjacent to said base station;

determining whether the terminal supports a definition of the transmission limit time frame; and updating at least one corrective value according to the definition in said transmission limit time frame information and said reception error information, and estimating a quality of said communication channel using said at least one corrective value, a result of the determining, and said acquired quality information, the at least one corrective value being updated by updating a first corrective value according to said transmission and reception error by a communication in said limit time frame by decrementing the first corrective value when the ACK is received and incrementing the first corrective value when the NACK is received, and updating a second corrective value according to said transmission and reception error by a communication in a time frame that is not said limit time frame by decrementing the second corrective value when the ACK is received and incrementing the second corrective value when the NACK is received.

2. The communication channel quality estimating method according to claim 1, wherein the updating and estimating comprises:

a calculating step of
calculating, in the communication in said limit time frame, the quality of the communication channel using said acquired quality information for the communication channel and said first corrective value, and
calculating, in the communication in a time frame that is not said limit time frame, the quality of the communication channel using said acquired quality information for the communication channel and said second corrective value.

3. The communication channel quality estimating method according to claim 2, wherein in the calculating step, quality information for the communication channel in said limit time frame is used as the first corrective value, and quality information for the communication channel in the time frame that is not said limit time frame is used as the second corrective value.

4. The communication channel quality estimating method according to claim 2, wherein said calculating step comprises:

determining initial values of said first and second corrective values from an average value or 50% value of first and second corrective values for currently connecting said terminals.

5. The communication channel quality estimating method according to claim 2, wherein the initial values of said first and second corrective values are defined as respective prespecified initial values.

6. The communication channel quality estimating method according to claim 1, wherein said data communication is a downlink data communication.

7. The communication channel quality estimating method according to claim 1, wherein said data communication is an uplink data communication.

8. The communication channel quality estimating method according to claim 1, wherein said adjacent base station is a base station determined based on communication channel quality information for a communication area of said adjacent base station.

9. The communication channel quality estimating method according to claim 1, wherein said adjacent base station is defined as a base station having a communication area that overlaps that of said base station and has an area greater than that of said base station.

10. The communication channel quality estimating method according to claim 1, wherein said adjacent base station is defined as a base station having a communication area that overlaps that of said base station and has an area smaller than that of said base station.

11. The communication channel quality estimating method according to claim 1, wherein said terminal is a terminal having a difference or a ratio between a received power level in said limit time frame and that received in a time frame that is not said limit time frame that is equal to or lower than a threshold.

12. A wireless communications system in which a base station wireless communicates with a terminal within a communication area, the system comprising:
one or more processors configured to:
acquire quality information for a communication channel between said base station and said terminal;
acquire transmission and reception error information relating to a transmission and reception error in a data communication using said communication channel and determine from the transmission and reception error information whether an acknowledgement (ACK) is received or a negative acknowledgement (NACK) is received;
acquire information on a transmission limit time frame defined by a base station adjacent to said base station;
determine whether the terminal supports a definition of the transmission limit time frame; and
update at least one corrective value according to the definition in said transmission limit time frame information and said reception error information, and estimate a quality of said communication channel using said at least one corrective value, a result of the determining, and said acquired quality information, the at least one corrective value being updated by updating a first corrective value according to said transmission and reception error by a communication in said limit time frame by decrementing the first corrective value when the ACK is received and incrementing the first corrective value when the NACK is received, and updating a second corrective value according to said transmission and reception error by a communication in a time frame that is not said limit time frame by decrementing the second corrective value when the ACK is received and incrementing the second corrective value when the NACK is received.

13. A base station for wireless communicating with a terminal within its communication area, the base station comprising:
one or more processors configured to:
acquire quality information for a communication channel between said base station and said terminal;
acquire transmission and reception error information relating to a transmission and reception error in a data communication using said communication channel and determine from the transmission and reception error information whether an acknowledgement (ACK) is received or a negative acknowledgement (NACK) is received;
acquire information on a transmission limit time frame defined by a base station adjacent to said base station;
determine whether the terminal supports a definition of the transmission limit time frame; and
update at least one corrective value according to the definition in said transmission limit time frame information and said reception error information, and estimate a quality of said communication channel using said at least one corrective value, a result of the determining, and said acquired quality information, the at least one corrective value being updated by updating a first corrective value according to said transmission and reception error by a communication in said limit time frame by decrementing the first corrective value when the ACK is received and incrementing the first corrective value when the NACK is received, and updating a second corrective value according to said transmission and reception error by a communication in a time frame that is not said limit time frame by decrementing the second corrective value when the ACK is received and incrementing the second corrective value when the NACK is received.

14. A non-transitory computer-readable medium to cause a base station to perform a method comprising:
acquiring quality information for a communication channel between said base station and said terminal;
acquiring transmission and reception error information relating to a transmission and reception error in a data communication using said communication channel and determining from the transmission and reception error information whether an acknowledgement (ACK) is received or a negative acknowledgement (NACK) is received;
acquiring information on a transmission limit time frame defined by a base station adjacent to said base station;
determining whether the terminal supports a definition of the transmission limit time frame; and
updating at least one corrective value according to the definition in said transmission limit time frame information and said reception error information, and estimating a quality of said communication channel using said at least one corrective value, a result of the determining, and said acquired quality information, the at least one corrective value being updated by updating a first corrective value according to said transmission and reception error by a communication in said limit time frame by decrementing the first corrective value when the ACK is received and incrementing the first corrective value when the NACK is received, and updating a second corrective value according to said transmission and reception error by a communication in a time frame that is not said limit time frame by decrementing the second corrective value when the ACK is received and incrementing the second corrective value when the NACK is received.

15. The communication channel quality estimating method according to claim 2, wherein said data communication is a downlink data communication.

16. The communication channel quality estimating method according to claim 3, wherein said data communication is a downlink data communication.

17. The communication channel quality estimating method according to claim 4, wherein said data communication is a downlink data communication.

18. The communication channel quality estimating method according to claim 5, wherein said data communication is a downlink data communication.

19. The communication channel quality estimating method according to claim 2, wherein said data communication is an uplink data communication.

20. The communication channel quality estimating method according to claim 3, wherein said data communication is an uplink data communication.

* * * * *